(12) United States Patent
Okubo et al.

(10) Patent No.: US 12,468,276 B2
(45) Date of Patent: Nov. 11, 2025

(54) SERVER AND POWER CONDITIONING SYSTEM

(71) Applicant: TOYOTA JIDOSHA KABUSHIKI KAISHA, Toyota (JP)

(72) Inventors: Atsushi Okubo, Nisshin (JP); Kiyonori Yoshida, Toyota (JP); Kotomi Asano, Toyota (JP); Tamaki Ozawa, Toyota (JP); Yusuke Saigo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 371 days.

(21) Appl. No.: 18/206,299

(22) Filed: Jun. 6, 2023

(65) Prior Publication Data
US 2024/0027983 A1 Jan. 25, 2024

(30) Foreign Application Priority Data
Jul. 19, 2022 (JP) .................. 2022-114698

(51) Int. Cl.
G05B 19/042 (2006.01)
B60L 55/00 (2019.01)
B60L 53/63 (2019.01)
B60L 53/68 (2019.01)

(52) U.S. Cl.
CPC ............ *G05B 19/042* (2013.01); *B60L 55/00* (2019.02); *B60L 53/63* (2019.02); *B60L 53/68* (2019.02); *G05B 2219/2639* (2013.01)

(58) Field of Classification Search
CPC .......... G05B 19/042; G05B 2219/2639; B60L 55/00; B60L 53/63; B60L 53/68; B60L 53/14; G06Q 10/063; G06Q 30/0201; G06Q 30/0283; G06Q 30/04; G06Q 30/0645; G06Q 50/06; G06Q 50/40; G06Q 10/02; G06Q 10/04; Y02T 10/70; Y02T 10/7072; Y02T 90/12
See application file for complete search history.

(56) References Cited

U.S. PATENT DOCUMENTS

| | | | |
|---|---|---|---|
| 11,615,409 B1* | 3/2023 | Rehm | G06Q 20/10 705/71 |
| 2014/0100708 A1* | 4/2014 | Ukita | H02J 7/00036 700/297 |

(Continued)

FOREIGN PATENT DOCUMENTS

WO 2020/241246 A1 12/2020

Primary Examiner — Santosh R Poudel
(74) Attorney, Agent, or Firm — Dinsmore & Shohl LLP

(57) ABSTRACT

A server is a server of an aggregator that requests a power-conditioning resource to participate in demand response for adjusting electric power demand-supply balance in a power grid. The power-conditioning resource includes a plurality of vehicles that is managed by a provider and used to provide a service thereof. The server includes a storage device and a processing device. The storage device is configured to store collection result information indicating results of participation of the vehicles in the demand response in a predetermined collection period. The processing device is configured to set an evaluation value indicating a degree of contribution of the provider to adjustment of electric power demand-supply balance based on the collection result information.

8 Claims, 10 Drawing Sheets

(56) References Cited

U.S. PATENT DOCUMENTS

| | | | |
|---|---|---|---|
| 2016/0025364 A1* | 1/2016 | Mills, Jr. | F24F 11/46 |
| | | | 700/278 |
| 2016/0075247 A1* | 3/2016 | Uyeki | H02J 3/00 |
| | | | 455/456.3 |
| 2018/0186246 A1* | 7/2018 | Kudo | B60L 58/16 |
| 2019/0188636 A1* | 6/2019 | Endo | G07C 9/00896 |
| 2021/0086647 A1* | 3/2021 | Kiessling | B60L 53/67 |
| 2021/0140771 A1* | 5/2021 | Igarashi | G06Q 30/02 |
| 2021/0380014 A1* | 12/2021 | Hishida | H02J 7/00 |
| 2023/0094931 A1* | 3/2023 | Asakura | B60L 53/66 |
| | | | 320/109 |

* cited by examiner

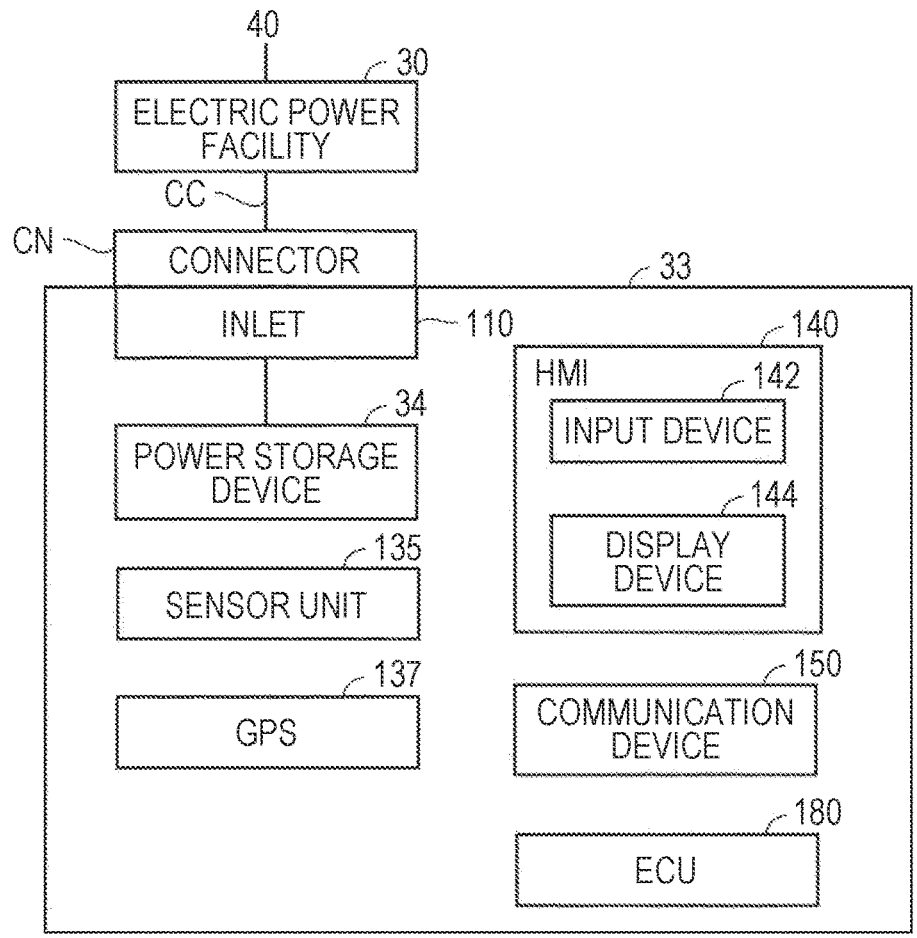

SERVER AND POWER CONDITIONING SYSTEM

CROSS-REFERENCE TO RELATED APPLICATION

This application claims priority to Japanese Patent Application No. 2022-114698 filed on Jul. 19, 2022 incorporated herein by reference in its entirety.

BACKGROUND

1. Technical Field

The present disclosure relates to a server and a power conditioning system.

2. Description of Related Art

Demand response (DR) for adjusting electric power demand-supply balance in a power grid has been studied in association with a virtual power plant (VPP). DR is a technique of requiring power-conditioning resources of consumers to change (for example, increase) demand for electric power.

WO 2020/241246 discloses an aggregator server in association with DR. The aggregator server includes an information acquiring unit and a contribution level calculating unit. The information acquiring unit acquires user information and electric power use information. The user information is information on a person who has used a predetermined spatial area in a predetermined time period. The electric power use information is information indicating that electric power has been used in a predetermined spatial area in a predetermined time period. The contribution level calculating unit calculates a contribution level at which a person contributes to adjustment use of electric power based on the user information and the electric power use information.

SUMMARY

A vehicle service provider such as a rental vehicle service provider or a car-sharing service provider manages a plurality of vehicles (hereinafter also referred to as "provider vehicles"). These provider vehicles can participate as power-conditioning resources in DR. In some embodiments, in view of adjustment of electric power demand-supply balance, a vehicle service provider may be motivated to allow the provider vehicles to participate in DR. This point of view has not been mentioned in WO 2020/241246.

The present disclosure provides a server and a power conditioning system that can contribute to adjustment of electric power demand-supply balance by motivating a vehicle service provider to allow provider vehicles to participate in DR.

A server according to an aspect of the present disclosure is a server of an aggregator that requests a power-conditioning resource to participate in demand response for adjusting electric power demand-supply balance in a power grid. The power-conditioning resource includes a plurality of provider vehicles that is managed by a vehicle service provider and that is used to provide a service thereof. The server includes a storage device and a processing device. The storage device is configured to store collection result information indicating results of participation of the plurality of provider vehicles in the demand response in a predetermined collection period. The processing device is configured to set an evaluation value indicating a degree of contribution of the vehicle service provider to the adjustment of electric power demand-supply balance based on the collection result information.

With this configuration, from a point of view of a degree of contribution to adjustment of electric power demand-supply balance, it is possible to quantitatively evaluate a vehicle service provider. Accordingly, it is possible to motivate the vehicle service provider to participate in DR using a plurality of provider vehicles based on the valuation value. As a result, it is possible to contribute to adjustment of electric power demand-supply balance.

Each of the plurality of provider vehicles may be configured to participate in the demand response using an electric power facility connected to the power grid. The evaluation value may be determined based on a total amount of electric power transmitted between the plurality of provider vehicles and the electric power facility for participation in the demand response in the collection period.

The evaluation value may be determined based on a total number of times the plurality of provider vehicles has participated in the demand response in the collection period.

The evaluation value may be determined based on a total length of periods in which the plurality of provider vehicles has participated in the demand response in the collection period.

The power-conditioning resource may include a participation-scheduled vehicle other than the plurality of provider vehicles. The participation-scheduled vehicle may be a vehicle that is scheduled to participate in the demand response using an electric power facility connected to the power grid. The server may further include a communication device configured to acquire position information indicating a location of the participation-scheduled vehicle. The processing device is configured to predict whether the participation-scheduled vehicle is able to reach the electric power facility at a start time of the demand response based on the position information, to generate a request signal for requesting a target vehicle which is able to participate in the demand response out of the plurality of provider vehicles to participate in the demand response instead of the participation-scheduled vehicle when it is predicted that the participation-scheduled vehicle is not able to reach the electric power facility at the start time, and to set the evaluation value to be higher when the target vehicle participates in the demand response in response to the request signal.

With this configuration, even when a participation-scheduled vehicle is not likely to participate in the DR, the target vehicle participates in the DR instead of the participation-scheduled vehicle and thus the evaluation value thereof is increased. Accordingly, it is possible to appropriately evaluate a provider from a point of view of adjustment of electric power demand-supply balance while contributing to adjustment of electric power demand-supply balance.

The power-conditioning resource may include a participation-scheduled vehicle other than the plurality of provider vehicles. The participation-scheduled vehicle may be a vehicle that is scheduled to participate in the demand response. The server may further include a communication device configured to acquire a replacement request from the participation-scheduled vehicle. The replacement request may be a signal for requesting the power-conditioning resource instead of the participation-scheduled vehicle to participate in the demand response. When the communication device receives the replacement request, the processing device may be configured to generate a request signal for requesting a target vehicle which is able to participate in the demand response out of the plurality of provider vehicles to participate in the demand response instead of the participation-scheduled vehicle and to set the evaluation value to be higher when the target vehicle participates in the demand response in response to the request signal.

Each of the plurality of provider vehicles may be configured to participate in the demand response by receiving electric power supplied from an electric power facility connected to the power grid. The processing device may be configured to set a command value for the supplied electric power and to set the command value to be greater when the evaluation is high than when the evaluation value is low.

With this configuration, when the evaluation value is high, participation in the DR ends earlier than when the evaluation value is low. Accordingly, a period of time in which a provider can use provider vehicles thereof for the original application thereof increases. As a result, it is possible to benefit the provider. Accordingly, it is possible to further motivate the provider to contribute to adjustment of electric power demand-supply balance.

The vehicle service provider may include a vehicle rental service provider or a car-sharing service provider.

A power conditioning system according to another aspect of the present disclosure includes the server and a power company server. The power company server is configured to request the server to adjust electric power demand-supply balance. The power company server is configured to set an electricity rate of the vehicle service provider to be lower when the evaluation value is high than when the evaluation value is low.

With this configuration, when a degree of contribution of the provider to adjustment electric power demand-supply balance is high, the provider can be benefited more than when the degree of contribution is low from a point of view of electricity rates. As a result, it is possible to further motivate the provider to contribute to adjustment of electric power demand-supply balance.

According to the present disclosure, it is possible to contribute to adjustment of electric power demand-supply balance by motivating a vehicle service provider to allow provider vehicles to participate in DR.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating a detailed configuration of a vehicle;

FIG. 3 is a diagram illustrating a database stored in a provider server;

DETAILED DESCRIPTION OF EMBODIMENTS

Figure 1:
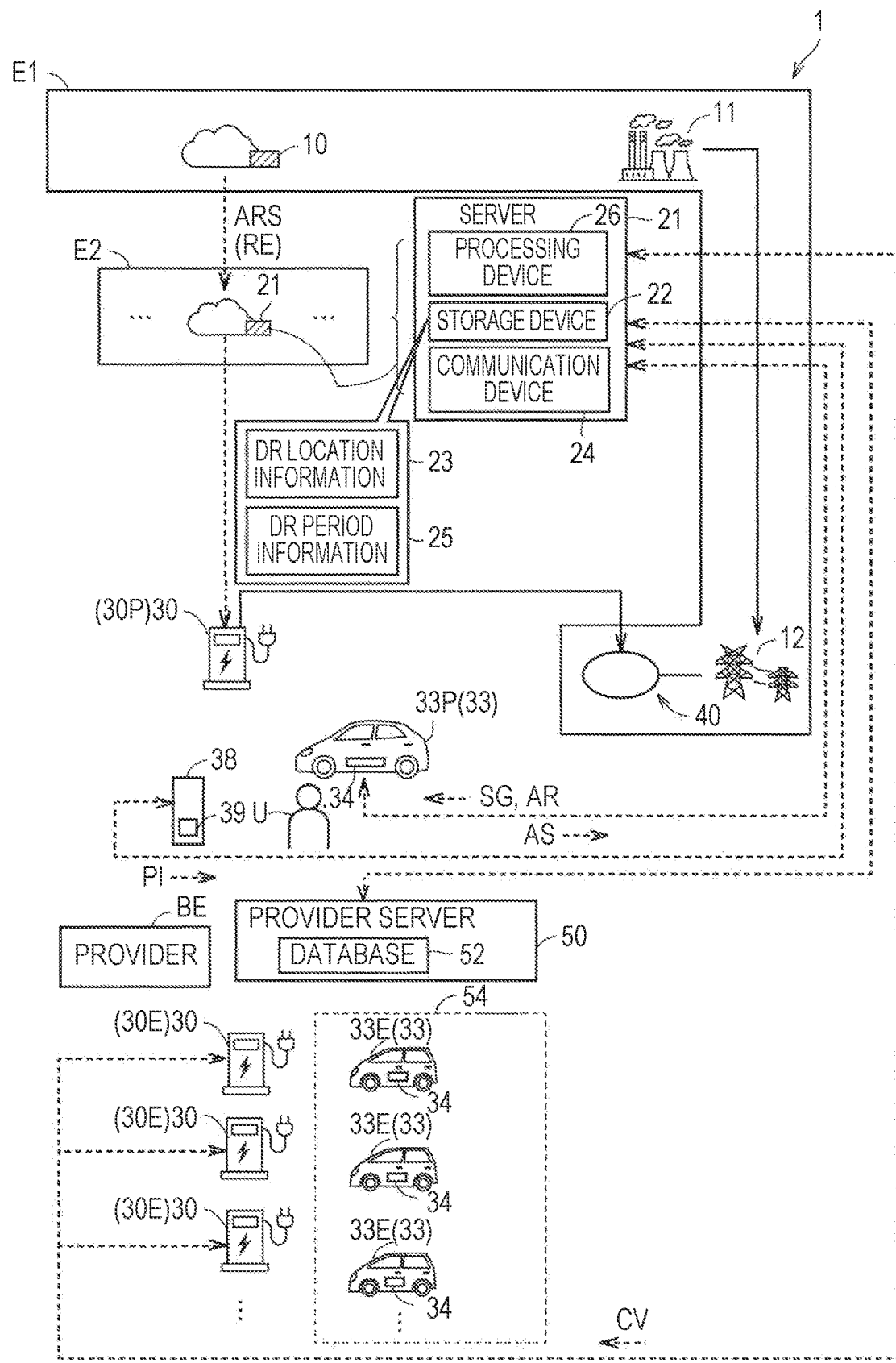
FIG. 1 is a diagram illustrating a configuration of a power conditioning system according to an embodiment.

An embodiment of the present disclosure will be described below in detail with reference to the accompanying drawings. The same or corresponding elements in the drawings will be referred to by the same reference signs and description thereof will not be repeated. In the following description, a vehicle in which a power storage device is mounted is mainly used as a power-conditioning resource.

FIG. 1 is a diagram illustrating a configuration of a power conditioning system according to an embodiment. Referring to FIG. 1, the power conditioning system 1 includes a power company system E1, an aggregation system E2, a plurality of electric power facilities 30 (30P and 30E), a vehicle 33P, a mobile terminal 38, a provider server 50, and a vehicle group 54 (a plurality of vehicles 33E).

The power company system E1 is managed by a power company and includes a server 10 (a power company server), a power plant 11, a power transmission and distribution facility 12, and a power grid 40. The server 10 is configured to communicate with an external device (for example, a server 21 (which will be described later)). The power plant 11 supplies electric power generated by a power generator to the power transmission and distribution facility 12. The power transmission and distribution facility 12 supplies electric power supplied from the power plant 11 to the power grid 40.

The aggregation system E2 includes a server 21 that is managed by an aggregator. The aggregator is a provider that requests a power-conditioning resource to participate in demand response. The server 21 receives an adjustment request signal ARS from the server 10. The adjustment request signal ARS is output from the server 10 such that the server 21 is requested to adjust electric power demand-supply balance. The adjustment request signal ARS includes information indicating a power-conditioning period, a power-conditioning area, and an amount of conditioning-required electric power RE. The power-conditioning period and the power-conditioning area are a period and an area in which power conditioning is required. The amount of conditioning-required electric power is an amount of electric power of which conditioning (for example, increasing) is required in the power-conditioning area in the power-conditioning period.

The server 21 divides the amount of conditioning-required electric power RE into n amounts (n≥2) in response to reception of the adjustment request signal ARS. The server 21 allocates the n divided amounts of electric power to n power-conditioning resources. In this embodiment, the n power-conditioning resources include a vehicle 33P that is personally owned by a user U and a plurality of vehicles 33E (which will be described later) that is managed by a provider BE. The vehicles 33P and 33E are also referred to as a vehicle 33.

The server 21 requests the vehicle 33P to participate in DR by receiving an allocated amount of electric power (an allocated electric power) from an electric power facility 30 at the DR location in the DR period or discharging the allocated electric power to the power grid 40 via the electric power facility 30. Specifically, the server 21 transmits a signal SG to the vehicle 33P and requests the vehicle 33P to participate in DR using the signal SG. The signal SG includes information indicating an allocated electric power, a DR period, and a DR location. The server 21 may transmit the signal SG to a mobile terminal 38 of a user U of the vehicle 33P in order to request the vehicle 33P to participate in DR. When the vehicle 33P is requested to participate in the DR due to receiving and discharging of electric power, it is assumed that the allocated electric power has positive and negative values corresponding thereto.

The DR period is a period in which a power-conditioning resource participates in DR and corresponds to a power-conditioning period. In this example, the DR period is a period in which the vehicle 33P is scheduled to participate in DR. The DR location is a location at which a power-conditioning resource participates in DR and is located in a power-conditioning area. In this example, the DR location corresponds to a location of an electric power facility 30P which is scheduled to be used for the vehicle 33P to participate in DR.

When the user U of the vehicle 33P approves participation in DR, an approval signal AS indicating the approval is transmitted from the vehicle 33P (or the mobile terminal 38) to the server 21. As a result, a contract is made between the user U of the vehicle 33P and the aggregator. After this contract has been made, the vehicle 33P is scheduled to participate in DR using the electric power facility 30P.

The server 21 includes a storage device 22, a communication device 24, and a processing device 26. The storage device 22 includes a random access memory (RAM) and a read only memory (ROM) (none of which are illustrated). The RAM serves as a working memory. The ROM stores a program which is executed by the processing device 26 and data. The data includes DR location information 23 and DR period information 25. The DR location information 23 and the DR period information 25 include information indicating a DR location and a DR period (more specifically, a start time and an end time thereof) for each power-conditioning resource.

The communication device 24 is configured to communicate with a device outside of the server 21. The device is, for example, the server 10, the vehicle 33, the mobile terminal 38, the electric power facility 30, or the provider server 50 (which will be described later).

The processing device 26 includes a processor such as a central processing unit (CPU). For example, the processing device 26 is configured to set a command value CV for electric power supplied from the electric power facility 30E to the vehicle 33E in the DR period. This supplied electric power corresponds to charging electric power of the power storage device 34 of the vehicle 33E when the vehicle 33E participates in the DR by receiving electric power. The command value CV is basically set to be less than a predetermined reference value. The reference value is a default value depending on the specifications of the electric power facility 30E and is appropriately set to be less than an upper limit of the supplied electric power (for example, 0.7 times the upper limit). The processing device 26 transmits the command value CV to the electric power facility 30E via the communication device 24.

The electric power facility 30 is connected to the power grid 40. The electric power facility 30 is configured to supply electric power to a vehicle 33 when it is electrically connected to the vehicle 33. The electric power facility 30 is also configured to receive electric power from the vehicle 33. The electric power facility 30 is used for the vehicle 33 to participate in the DR. The electric power facility 30E includes a sensor unit (not illustrated) that detects electric power transmitted to and from the vehicle 33 while the vehicle 33 is participating in the DR. The electric power facility 30E further includes a communication device (not illustrated) and is configured to receive the command value CV from the server 21 via the communication device.

The vehicle 33 is an electric vehicle in which the power storage device 34 is mounted. The vehicle 33 is configured to participate in the DR by performing receiving of electric power (for example, external charging) using the electric power facility 30 or supply of electric power to the power grid 40 (for example, external discharging). External charging is charging of the power storage device 34 using electric power supplied from the electric power facility 30. External discharging is discharging of electric power stored in the power storage device 34 to the power grid 40 via the electric power facility 30. An amount of electric power stored in the power storage device 34 is expressed, for example, as a state of charge (SOC).

The mobile terminal 38 is a terminal device that is carried by a user U and is, for example, a smartphone. The mobile terminal 38 includes a global positioning system (GPS) receiver 39. The GPS receiver 39 acquires position information PI of the mobile terminal 38. The position information PI is used as position information of the user U and is transmitted to, for example, the server 21. The mobile terminal 38 further includes a human-machine interface (HMI) device (not illustrated).

The provider server 50 is operated by a provider BE. The provider server manages use (for example, reservation) of a client of the provider BE for a plurality of vehicles 33E. The provider BE is a vehicle service provider that provides a service to a client using the plurality of vehicles 33E. In this example, the provider BE is a vehicle rental service provider, but may be a car sharing service provider. It is assumed that the user U is registered as a member in the provider BE.

Each vehicle 33E is a provider vehicle that is managed by the provider BE and used for the provider BE to provide a service. In this example, each vehicle 33E is a rental vehicle and is disposed in a site of the provider BE. Each vehicle 33E is configured to participate in DR using the electric power facilities 30.

The electric power facilities 30E are installed in the vicinity of the vehicles 33E in the site of the provider BE.

The provider server 50 stores a database 52. The database 52 includes various types of information of the vehicles 33E. The structure of the database 52 will be described later in detail. The database 52 may be accessed by the server 21.

FIG. 2 is a diagram illustrating the detailed configuration of a vehicle 33. In this example, the vehicle 33 is connected to an electric power facility 30.

Referring to FIG. 2, the vehicle 33 includes a power storage device 34, an inlet 110, a sensor unit 135, a GPS receiver 137, an HMI device 140, a communication device 150, and an electronic control unit (ECU) 180.

A power cable CC extending from the electric power facility 30 and a connector CN thereof can be connected to the inlet 110. Electric power received by the inlet 110 is supplied to the power storage device 34. A power converter may be provided between the inlet 110 and the power storage device 34.

The sensor unit 135 detects electric power supplied from the electric power facility 30 to the vehicle 33 or electric power discharged from the power storage device 34 to the electric power facility 30. The supplied electric power and the discharged electric power are detected as electric power having positive and negative detection values.

The GPS receiver 137 acquires position information of the vehicle 33. The position information may be transmitted as position information of the user U to the server 21 instead of the position information PI.

The HMI device 140 is, for example, a touch screen and includes an input device 142 and a display device 144. The input device 142 receives an input of various operations by a user U. The display device 144 displays various screens. A specific example of the screens displayed by the display device 144 will be described later in detail.

The communication device 150 is configured to communicate with a device (for example, the server 21) outside of the vehicle 33. When the inlet 110 is connected to the connector CN, the communication device 150 may be configured to communicate with the electric power facility 30 by controller area network (CAN) communication.

The ECU 180 controls various devices of the vehicle 33. The ECU 180 calculates (estimates) the SOC of the power storage device 34 based on the detection value from the sensor unit 135. The ECU 180 calculates an amount of chargeable electric power and an amount of dischargeable electric power of the power storage device 34 based on a fully charged capacity and the SOC of the power storage device 34.

The ECU 180 controls start and end of transmission of electric power between the vehicle 33 and the electric power facility 30. When the DR period comes in a state in which the power cable CC and the connector CN are connected to the inlet 110, the ECU 180 outputs a charging start request or a discharging start notification to the electric power facility 30 by CAN communication. Thereafter, participation in the DR using transmission of electric power such as external charging or external discharging. Which of external charging and external discharging is to be performed differs depending on whether the allocated electric power has a positive value or a negative value.

The ECU 180 determines whether an amount of electric power transmitted in the DR period (an absolute value of an amount of supplied electric power supplied from the electric power facility 30 to the vehicle 33 during external charging or an amount of discharging electric power supplied from the power storage device 34 to the electric power facility 30 during external discharging) has reached the allocated electric power based on the detection value from the sensor unit 135.

When the amount of transmitted electric power reaches the allocated electric power, the ECU 180 outputs a charging end request (or a discharging end notification) to the electric power facility 30 by CAN communication. Thereafter, transmission of electric power ends. As a result, participation of the vehicle 33 in the DR ends.

After the DR period has expired, the ECU 180 transmits participation result information indicating a result of participation of the vehicle 33 in the DR in the DR period and identification information of the vehicle 33 to the electric power facility 30 by CAN communication.

The participation result information indicates a period in which the vehicle 33 actually participates in the DR (a period in which transmission of electric power between the vehicle 33 and the electric power facility 30 is actually performed) and an amount of electric power transmitted in the period (an amount of DR transmitted electric power). The participation result information may further include information of one of whether the amount of transmitted electric power has reached the allocated electric power (the allocated electric power has been completely achieved), whether a part of the allocated electric power has been achieved, and whether the allocated electric power has not been achieved at all and a contract has not been fulfilled.

When the participation result information and the identification information are received from the vehicle 33, the electric power facility 30 determines whether the participation result information is authorized (whether the participation result information is separated from an actual result of DR participation) based on the detection result of the sensor unit of the electric power facility 30. Specifically, the electric power facility 30 determines whether the received participation result information matches the detection result from the sensor unit of the electric power facility 30. For example, the electric power facility 30 determines whether a difference between the amount of transmitted electric power detected by the sensor unit in the DR period and the amount of DR transmitted electric power included in the participation result information is within a predetermined tolerance range. The tolerance range is appropriately determined in advance based on detection accuracy of the sensor unit of the electric power facility 30.

In this example, the electric power facility 30 determines that the participation result information is authorized and transmits the participation result information and the identification information to the server 21 based on the determination result. In this way, when the participation result information and the identification information are transmitted from the vehicle 33 to the server 21 via the electric power facility it is possible to guarantee authorization of the information (it is possible to prevent unfair authorization). As a result, it is also possible to guarantee authorization of an evaluation value (which will be described later). When it is determined that the participation result information is not authorized, the electric power facility 30 may notify the server 21 of the gist. The vehicle 33 may directly transmit the participation result information and the identification information to the server 21.

FIG. 3 is a diagram illustrating the database 52 stored in the provider server Referring to FIG. 3, the database 52 includes management information 520 of the vehicles 33E. The management information 520 includes a vehicle identification (ID) 521, unavailable period (reserved period) information 522, available period information 523, chargeable electric power information 526, and dischargeable electric power information 527.

The vehicle ID 521 indicates identification information of a corresponding vehicle 33E. The unavailable period information 522 indicates a period in which a corresponding vehicle 33E is not available by a client of the provider BE or is not available as a power-conditioning resource (an unavailable period). This period is, for example, a period in which rental of the vehicle 33E is reserved already by another client. The available period information 523 indicates a period in which a corresponding vehicle 33E is available by a client of the provider BE or is available as a power-conditioning resource (an available period). This period is, for example, a period in which rental of the vehicle 33E is not reserved by another client yet.

The chargeable electric power information 526 indicates an amount of chargeable electric power of the power storage device 34 of a corresponding vehicle 33E. The dischargeable electric power information 527 indicates an amount of dischargeable electric power of the power storage device 34 of a corresponding vehicle 33E. The chargeable electric power information 526 and the dischargeable electric power information 527 are transmitted to the provider server 50 by the communication device 150 of the vehicle 33E.

In some embodiments, from a point of view of adjustment of electric power demand-supply balance, the provider BE may be motivated to participate in the DR using the vehicles 33E.

The server 21 according to the embodiment has a configuration for motivating the vehicles 33E to participate in the DR. Specifically, the storage device 22 of the server 21 stores collection result information indicating a result of participation in the DR using the vehicles 33E over a predetermined collection period. The predetermined collection period is, for example, 1 day, 1 week, 1 month, 1 quarter, a half year, or 1 year. The processing device 26 sets an evaluation value indicating a degree of contribution of the provider BE to adjustment of electric power demand-supply balance based on the collection result information. Specific examples of the collection result information and the evaluation value will be described later in detail.

When an evaluation value is set as described above, it is possible to quantitatively evaluate the provider BE from a point of view of the degree of contribution to adjustment of electric power demand-supply balance. As a result, it is possible to motivate the provider BE to participate in the DR using the vehicles 33E based on the valuation value.

Figure 4:
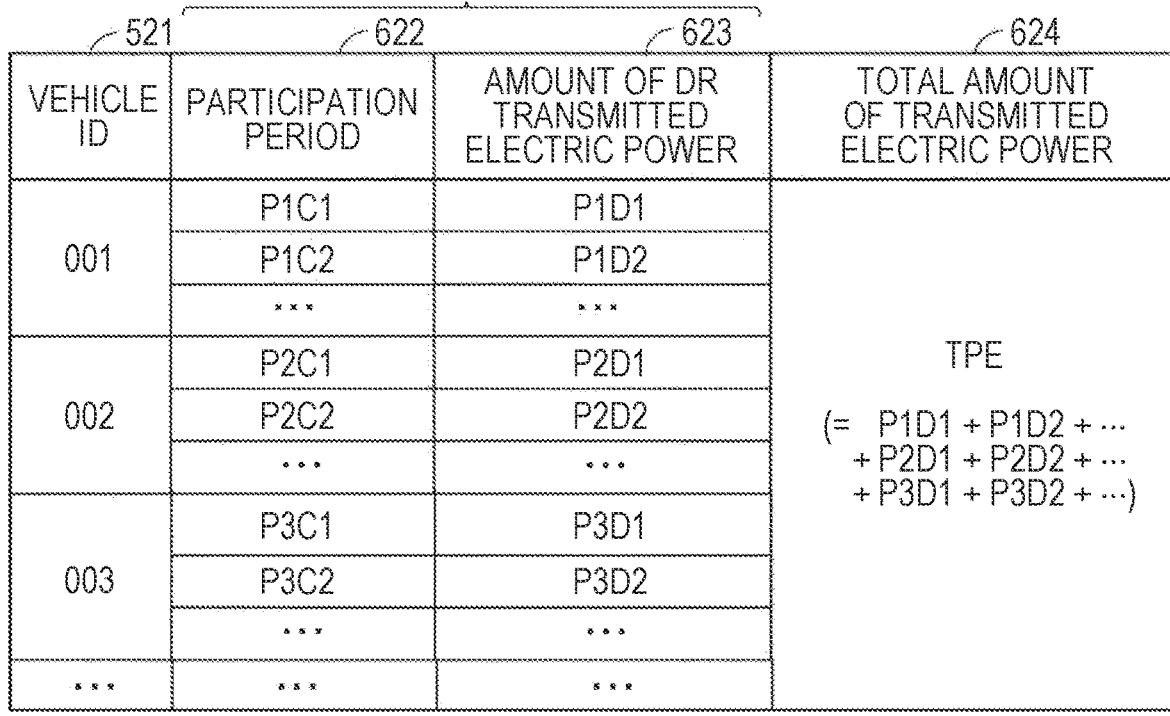
FIG. 4 is a diagram illustrating an example of collection result information.

FIG. 4 is a diagram illustrating an example of the collection result information. Referring to FIG. 4, the collection result information 620 includes a vehicle ID 521, participation result information 621, and total transmitted electric power information 624. The participation result information 621 includes participation period information 622 and DR transmitted electric power information 623.

The participation period information 622 indicates a period in which a corresponding vehicle 33E actually participates in the DR in the collection period. This period corresponds to a previous DR period of the vehicle 33E.

The DR transmitted electric power information 623 indicates an amount of electric power actually transmitted between a corresponding vehicle 33E and the electric power facility 30 in the corresponding DR period in the collection period. This amount of electric power corresponds to, for example, an absolute value of an amount of charged electric power or an amount of discharged electric power in the previous DR period.

The total transmitted electric power information 624 indicates a total amount of electric power actually transmitted between the vehicles 33E and the electric power facilities 30 to participate in the DR over the collection period. This total amount of electric power corresponds to a sum of the amounts of DR transmitted electric power for the vehicles 33E and the DR periods over the collection period.

The evaluation value for the provider BE is determined, for example, based on the total amount of electric power by the server 21. In this embodiment, for the purpose of facilitation of description, it is assumed that the server 21 handles the value of the total amount of electric power itself as the evaluation value.

The evaluation value may be determined based on the total number of times the vehicles 33E participate in the DR over the collection period (for example, it may be the total number of times itself). The total number of times corresponds to the number of periods indicated by the participation period information 622.

Similarly, the evaluation value may be determined based on the total length of the periods in which the vehicles 33E participate in the DR over the collection period (for example, it may be the total length itself). The total length corresponds to the sum of lengths of periods indicated by the participation period information 622.

When the collection period starts and a DR period of a certain vehicle 33E expires (that is, when a DR period of a certain vehicle 33E out of a plurality of vehicles 33E ends), the processing device 26 receives the participation result information 621 of the vehicle 33E and the vehicle ID 521 of the vehicle 33E from the electric power facility 30 used to participate in the DR. The processing device 26 updates the collection result information 620 whenever the receiving process is performed.

Specifically, the server 21 adds the participation period information 622 and the DR transmitted electric power information 623 of the vehicle 33E participating in the DR to the collection result information 620 immediately before the participation result information 621 is acquired. The server 21 updates the total transmitted electric power information 624 based on the total transmitted electric power information 624 immediately before the participation result information 621 is acquired and the added DR transmitted electric power information 623. Accordingly, the server 21 updates (sets) the evaluation value for the provider BE. When the collection period expires, the processing device 26 confirms the collection result information 620 for the provider BE.

The processing device 26 sets an evaluation value for a vehicle service provider other than the provider BE.

Figure 5:
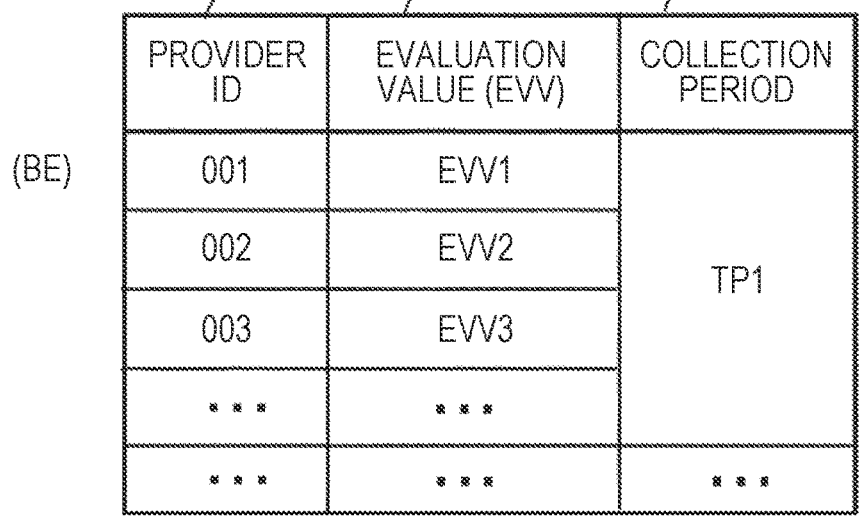
FIG. 5 is a diagram illustrating an example in which an evaluation value is set for each vehicle service provider.

FIG. 5 is a diagram illustrating an example in which an evaluation value is set for each vehicle service provider. Referring to FIG. 5, an evaluation value data set 720 is stored in the storage device 22. The evaluation value data set 720 includes a provider ID 721, evaluation value information 722, and collection period information 723.

The provider ID 721 indicates identification information of a corresponding provider. The evaluation value information 722 indicates an evaluation value EVV set for a corresponding provider. The collection period information 723 indicates a collection period which is used to calculate the corresponding evaluation value EVV. In this example, the ID of the provider BE is 001, and the evaluation value EVV indicating a degree of contribution to electric power demand-supply balance in the collection period TP1 is EVV1.

Figure 6:
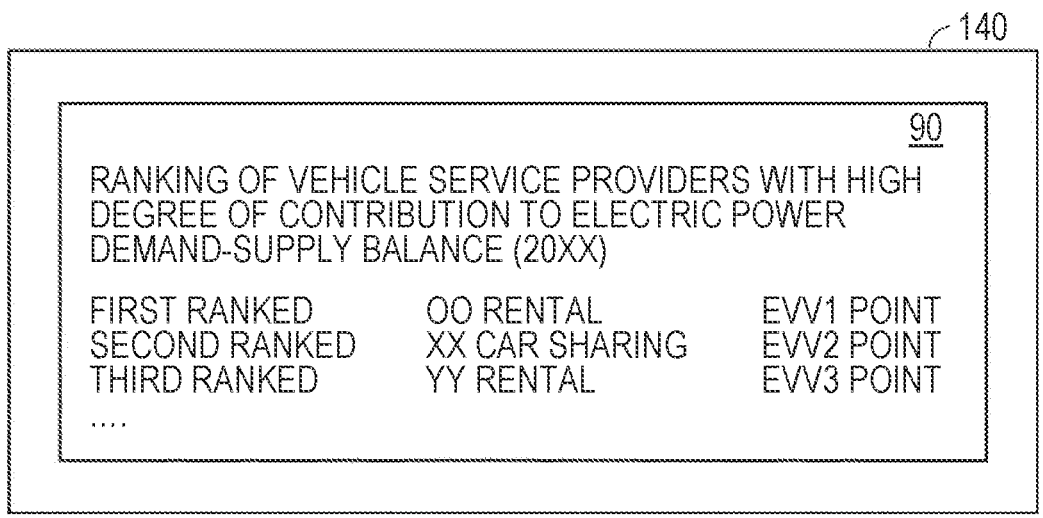
FIG. 6 is a diagram illustrating a screen representing an evaluation value for each vehicle service provider.

FIG. 6 is a diagram illustrating a screen representing the evaluation value EVVs of the vehicle service providers. Referring to FIG. 6, a screen 90 represents that the vehicle service providers are ranked based on the evaluation values EVV. In this example, the screen 90 is displayed on the HMI device 140, but may be displayed on the HMI device of the mobile terminal 38 or another HMI device.

When the screen 90 is displayed in this way, the degrees of contribution of the vehicle service providers to electric power demand-supply balance are recognized by a user of the HMI device. Accordingly, the degrees of contribution can be socially recognized. As a result, a vehicle service provider such as the provider BE can be motivated to enhance the evaluation values EVV for the purpose of image-up (that is, to contribute to adjustment of electric power demand-supply balance).

The processing device 26 may notify the provider server 50 of the evaluation value EVV of the provider BE and the ranking result (including the rank of the provider BE in the ranking). Accordingly, it is possible to cause the provider BE to recognize the degree of contribution to electric power demand-supply balance. As a result, it is possible to more effectively motivate the provider BE to participate in the DR using the vehicles 33E.

Figure 7:
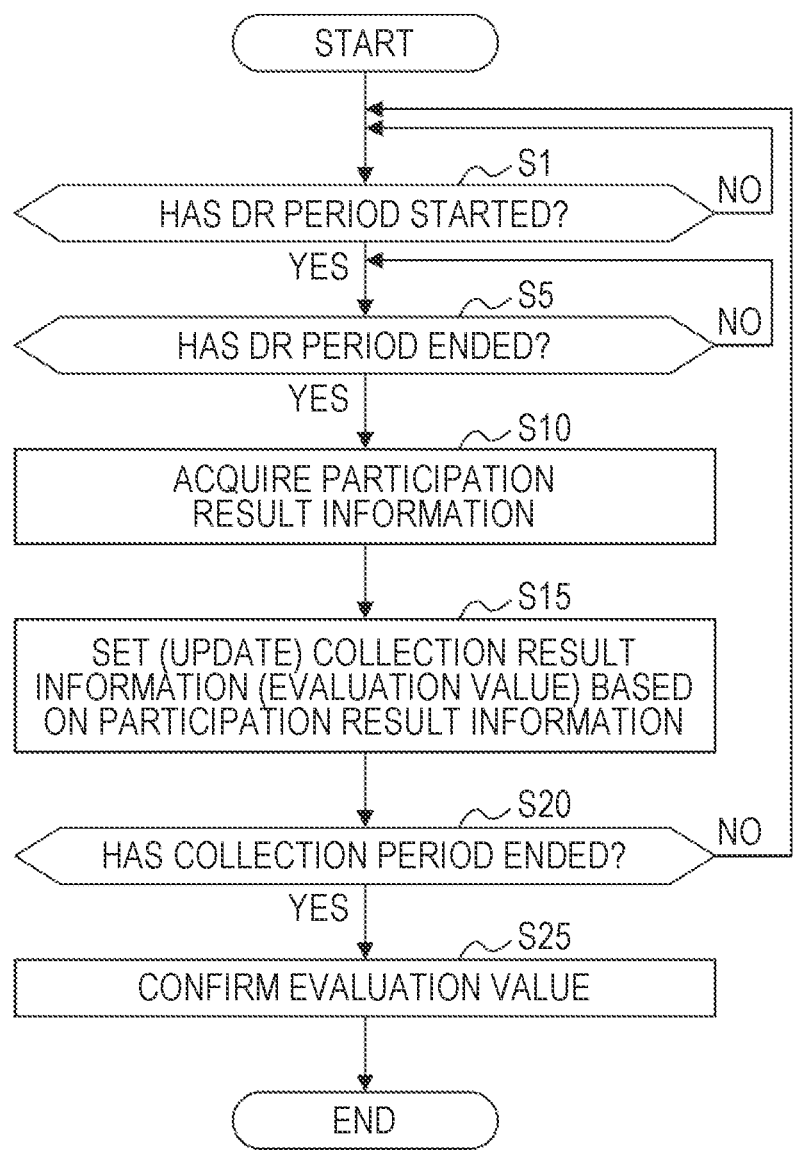
FIG. 7 is a flowchart illustrating an example of a routine which is performed by a processing device of a server according to the embodiment.

FIG. 7 is a flowchart illustrating an example of a routine which is performed by the processing device 26 of the server 21 according to this embodiment. This flowchart starts when the collection period comes. The flowchart is performed on the provider BE (FIG. 1), but can be performed on other providers in the same way. When the flowchart starts, it is assumed that the evaluation value EVV for the provider BE is a predetermined default value (for example, 0).

Referring to FIG. 7, the server 21 determines whether a DR period of a certain vehicle 33E has started, that is, whether a DR period of a certain vehicle 33E out of a plurality of vehicles 33E has started, based on the DR period information 25 (Step S1). When the DR period has not started (NO in Step S1), the server 21 performs this determination process until the DR period starts. On the other hand, when the DR period starts (YES in Step S1), the routine proceeds to Step S5.

The server 21 determines whether the DR period of the vehicle 33E has ended based on the DR period information 25 (Step S5). When the DR period has not ended (NO in Step S5), the server 21 performs this determination process until the DR period ends. On the other hand, when the DR period has ended (YES in Step S5), the routine proceeds to Step S10.

The server 21 acquires the participation result information 621 of the vehicle 33E in response to end of the DR period (Step S10) and sets the collection result information 620 based on the participation result information 621 (Step S15). The collection result information 620 includes the evaluation values EVV as the total transmitted electric power information 624.

The server 21 determines whether the collection period has ended (Step S20). When the collection period has not yet ended (NO in Step S20), the server 21 causes the routine to return to Step S1 and determines whether a next DR period has started. Then, the server 21 repeatedly performs Steps S1 to S20 until the collection period ends. Accordingly, the collection result information 620 (the evaluation value EVV) is sequentially updated.

On the other hand, when the collection period has ended (YES in Step S20), the server 21 confirms the evaluation value EVV of the provider BE corresponding to the collection period (Step S25). Thereafter, the routine illustrated in FIG. 7 ends.

When the collection period has ended, the server 21 confirms the evaluation value EVV of another provider other than the provider BE. Thereafter, the server 21 ranks the vehicle service providers based on the plurality of confirmed evaluation values EVV and displays a screen indicating the ranking result (for example, the screen 90) on the HMI device 140.

As described above, according to the embodiment, it is possible to quantitatively evaluate the provider BE from a point of view of the degree of contribution to adjustment of electric power demand-supply balance. As a result, it is possible to motivate the provider BE to participate in the DR using the vehicles 33E based on the evaluation value EVV. Accordingly, it is possible to contribute to adjustment of electric power demand-supply balance.

MODIFIED EXAMPLE 1

Figure 8:
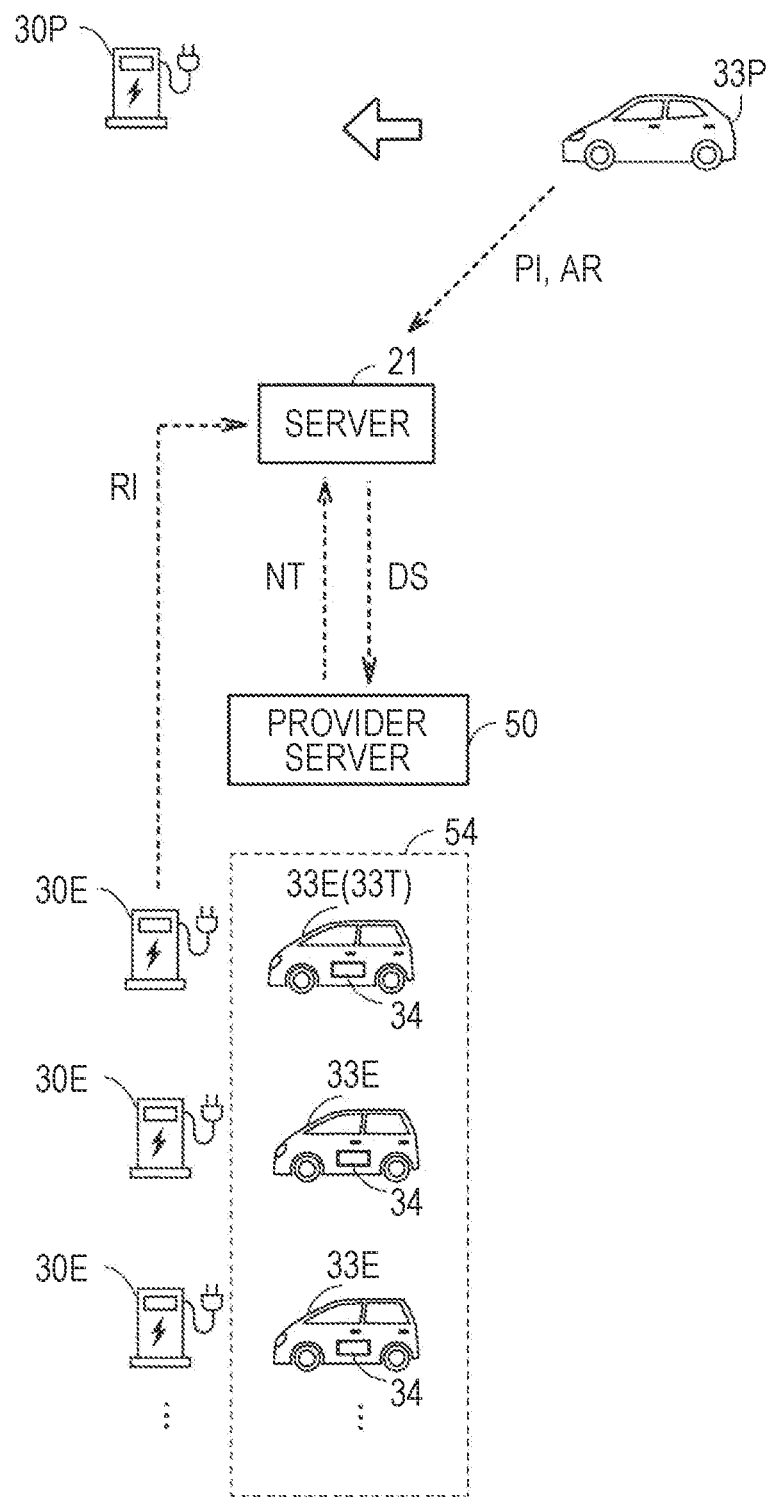
FIG. 8 is a diagram illustrating a routine of a server according to Modified Example 1.

FIG. 8 is a diagram illustrating a routine that is performed by a server 21 according to Modified Example 1. Referring to FIG. 8, a vehicle 33P is a vehicle 33 which is scheduled to participate in the DR using an electric power facility 30P in the DR period (a participation-scheduled vehicle).

A case in which the vehicle 33P cannot reach the electric power facility 30P until the start time of the DR period due to change of the schedule of the user U or congestion is conceivable. In this case, participation in the DR using the vehicle 33P (fulfillment of a contract) is difficult. This situation is not desirable in view of adjustment of electric power demand-supply balance.

In Modified Example 1, the server 21 predicts whether the vehicle 33P can reach the electric power facility 30P until the start time of the DR based on the position information PI, the DR location information 23, and the DR period information 25.

The server 21 generates a request signal DS when it is predicted that the vehicle 33P cannot reach the electric power facility 30 until the start time of the DR. The request signal DS is a signal for requesting participation in the DR using a target vehicle out of the plurality of vehicles 33E instead of the vehicle 33P. The target vehicle is, for example, a vehicle 33E satisfying a condition that the available period includes the DR period and electric power equal to or greater than an absolute value of the allocated electric power can be charged or discharged in the DR period. The request signal DS includes information indicating the allocated electric power and the DR period of the vehicle 33P.

The server 21 transmits the request signal DS to the provider server 50. The server 21 inquires the provider server 50 about whether a target vehicle is present using the request signal DS. In response to the inquiry, the provider server 50 determines whether a target vehicle is present based on the available period information 523, the chargeable electric power information 526, and the dischargeable electric power information 527. In this example, it is assumed that the provider server 50 determines that a target vehicle is present and the target vehicle is a vehicle 33T. On the other hand, when a target vehicle is not present, the provider server 50 transmits a notification NS indicating that a target vehicle is not present to the server 21.

Since the vehicle 33T is a target vehicle, the provider server 50 updates the management information 520 of the vehicle 33T. Specifically, the provider server 50 updates the management information 520 of the vehicle 33T such that the DR period is added as the unavailable period of the vehicle 33T (that is, such that the available period of the vehicle 33T is shortened by the DR period). Then, the provider server 50 notifies an employee of the provider BE that the vehicle 33T participates in the DR using the electric power facility 30E. Thereafter, the vehicle 33T is connected to the electric power facility via the power cable CC and the connector CN by the employee.

Accordingly, even when the vehicle 33P has difficulty participating in the DR, the vehicle 33T participates in the DR instead of the vehicle 33P. After the DR period ends, the electric power facility 30E used by the vehicle 33T transmits the participation result information 621 and the identification information of the vehicle 33T to the server 21.

The server 21 confirms that the vehicle 33T participates in the DR in response to the request signal DS based on the participation result information and the identification information. Thereafter, the server 21 updates the collection result information 620 such that the evaluation value EVV for the provider BE (the total transmitted electric power information 624) increases.

A case in which the server 21 receives an replacement request AR instead of the position information PI from the vehicle 33P will be described in Modified Example 2.

Figure 9:
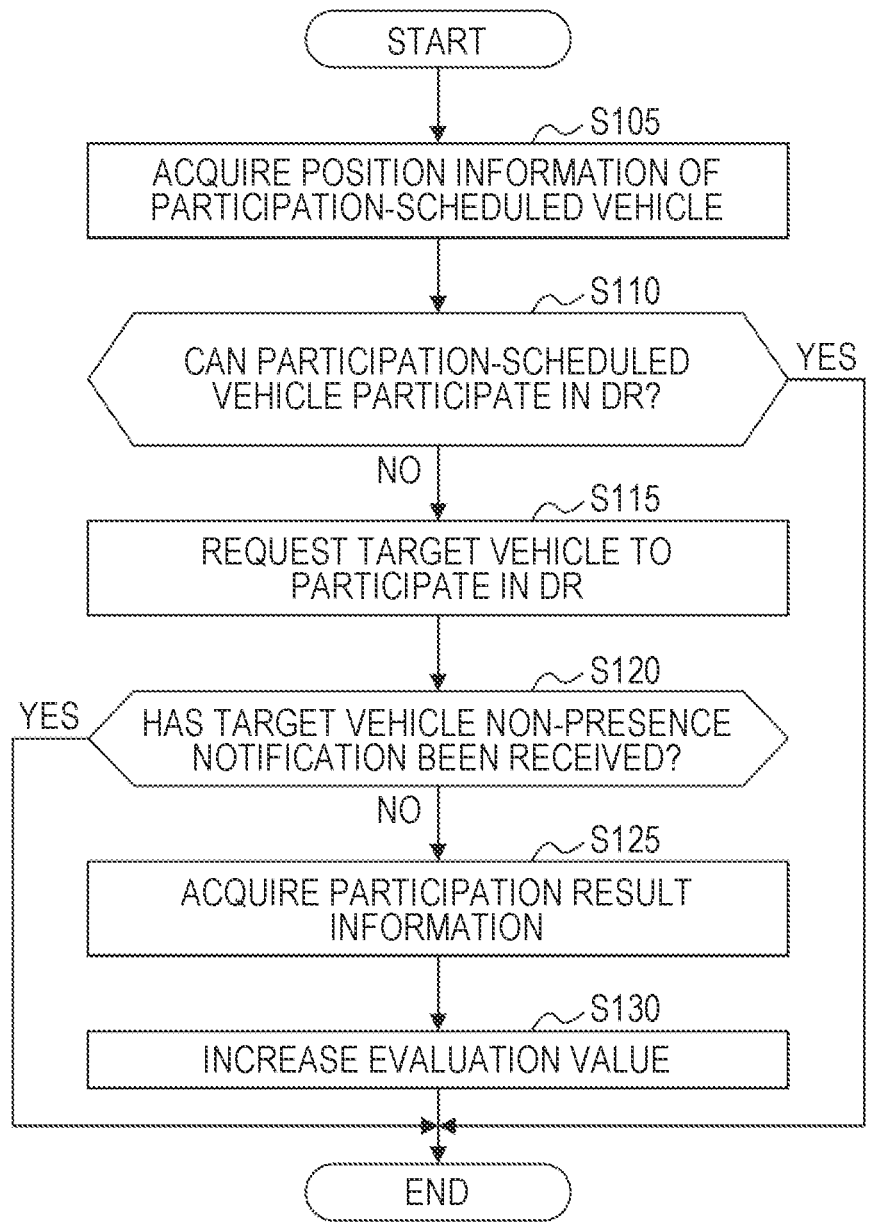
FIG. 9 is a flowchart illustrating an example of a routine which is performed by a processing device of a server according to Modified Example 1.

FIG. 9 is a flowchart illustrating an example of a routine which is performed by the processing device 26 of the server 21 according to Modified Example 1. This flowchart starts in a predetermined time (for example, 1 hour) before the DR period of the vehicle 33P starts.

Referring to FIG. 9, the server 21 acquires the position information PI of the vehicle 33P (a participation-scheduled vehicle) via the communication device 24 (Step S105).

The server 21 predicts whether the vehicle 33P can participate in the DR (Step S110). When it is predicted that the vehicle 33P can participate in the DR, that is, the vehicle 33P can reach the electric power facility 30 until the start time of the DR (YES in Step S110), the server 21 ends the routine. On the other hand, when it is predicted that the vehicle 33P cannot participate in the DR, that is, the vehicle 33P cannot reach the electric power facility 30 until the start time of the DR (NO in Step S110), the server 21 requests participation in the DR using a target vehicle by transmitting the request signal DS to the provider server 50 (Step S115).

The server 21 determines whether a notification NS (a target vehicle non-presence notification) has been received (Step S120). When a notification NS has been received (YES in Step S120), the server 21 ends the routine. On the other hand, when a notification NS has not been received (NO in Step S120), the server 21 causes the routine to proceed to Step S125.

The server 21 acquires the participation result information 621 of the vehicle 33T from the electric power facility 30 used for the vehicle 33T to participate in the DR (Step S125). It is assumed that the participation result information indicates that the amount of electric power transmitted between the vehicle 33T and the electric power facility has reached the allocated electric power.

The server 21 confirms that a target vehicle has participated in the DR in response to the request signal DS based on the participation result information and increases the evaluation value EVV for the provider BE based on the confirmation result (Step S130). Thereafter, the routine illustrated in FIG. 9 ends.

According to Modified Example 1, the server 21 transmits the request signal DS to the provider server 50 when it is predicted that the vehicle 33P cannot reach the electric power facility 30P until the start time of the DR. Accordingly, participation in the DR using the vehicle 33T instead of the vehicle 33P is possible. As a result, it is possible to contribute to adjustment of electric power demand-supply balance. The evaluation value EVV for the provider BE increases due to the participation in the DR. Accordingly, it is possible to appropriately evaluate the provider BE from a point of view of adjustment of electric power demand-supply balance while contributing to adjustment of electric power demand-supply balance.

MODIFIED EXAMPLE 2

The routine of the server 21 according to Modified Example 2 will be described below with reference back to FIG. 8. The communication device 24 of the server 21 according to Modified Example 2 is configured to receive a replacement request AR from the vehicle 33P (a participation-scheduled vehicle).

The replacement request AR is a signal for requesting participation in the DR using a power-conditioning resource instead of the vehicle 33P. The replacement request AR is transmitted to the communication device 150 in response to a user operation using the HMI device 140 (FIG. 2) of the vehicle 33P. The user U can perform the user operation when it is determined that the user U cannot reach the electric power facility 30 until the start time of the DR period.

It is assumed that the power-conditioning resource is a vehicle 33E of the provider BE in which the user U is registered as a member. That is, it is assumed that the user U makes a special contract (a replacement special contract) for enabling requesting participation in the DR using the vehicle 33E instead of the vehicle 33P with the provider BE in advance.

When the communication device 24 has received the replacement request AR, the processing device 26 generates a request signal DS for requesting participation in the DR using a target vehicle instead of the vehicle 33P and transmits the request signal DS to the provider server 50. The subsequent routine is the same as in the case according to Modified Example 1. For example, when it is confirmed that the vehicle 33T has participated in the DR in response to the request signal DS, the processing device 26 increases the evaluation value EVV for the provider BE.

Figure 10:
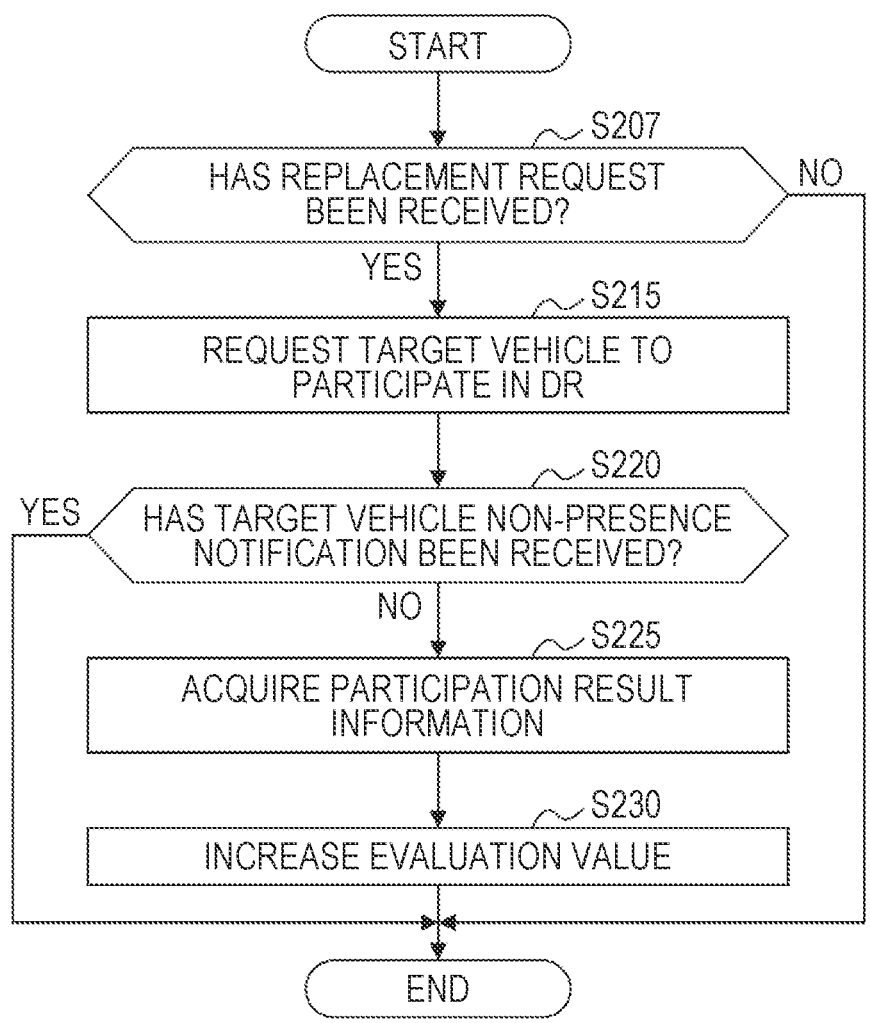
FIG. 10 is a flowchart illustrating an example of a routine which is performed by a processing device of a server according to Modified Example 2.

FIG. 10 is a flowchart illustrating an example of a routine which is performed by the processing device 26 of the server 21 according to Modified Example 2. This flowchart starts in a predetermined time (for example, 1 hour) before the DR period of the vehicle 33P starts.

Referring to FIG. 10, the flowchart is different from the flowchart illustrated in FIG. 9 in that Step S207 is performed instead of Steps S105 and S110. Steps S215 to S230 are the same as Steps S115 to S130.

The server 21 switches the routine based on whether a replacement request AR has been received until a time (for example, 10 minutes) immediately before the DR period starts (Step S207). When the replacement request AR has not been received until that time (NO in Step S207), the server 21 ends the routine. On the other hand, when the replacement request AR has been received until that time (YES in Step S207), the server 21 causes the routine to proceed to Step S215.

According to Modified Example 2, even when the server 21 cannot acquire the position information PI (when a GPS receiver is not mounted in the vehicle 33P or the mobile terminal 38), participation in the DR using the vehicle 33T instead of the vehicle 33P is possible. Similarly to Modified Example 1, it is possible to appropriately evaluate the provider BE from a point of view of adjustment of electric power demand-supply balance while contributing to adjustment of electric power demand-supply balance.

MODIFIED EXAMPLE 3

In Modified Example 3, each vehicle 33E participates in the DR by receiving electric power supplied from the electric power facility 30E (for example, by external charging). The processing device 26 of the server 21 sets the command value CV of electric power supplied from the electric power facility 30E to the vehicle 33E to be greater when the evaluation value EVV is high than when the evaluation value EVV is low.

For example, the evaluation value EVV is confirmed for a first collection period. The command value CV is set in a second collection period subsequent to the first collection period.

For example, the server 21 sets the command value CV when the evaluation value EVV is equal to or greater than a threshold value to be greater than the command value CV when the evaluation value EVV is less than the threshold value. The threshold value is appropriately determined based on the evaluation value EVV set for each vehicle service provider and is, for example, a value corresponding to upper 20% of the evaluation values EVV.

Figure 11:
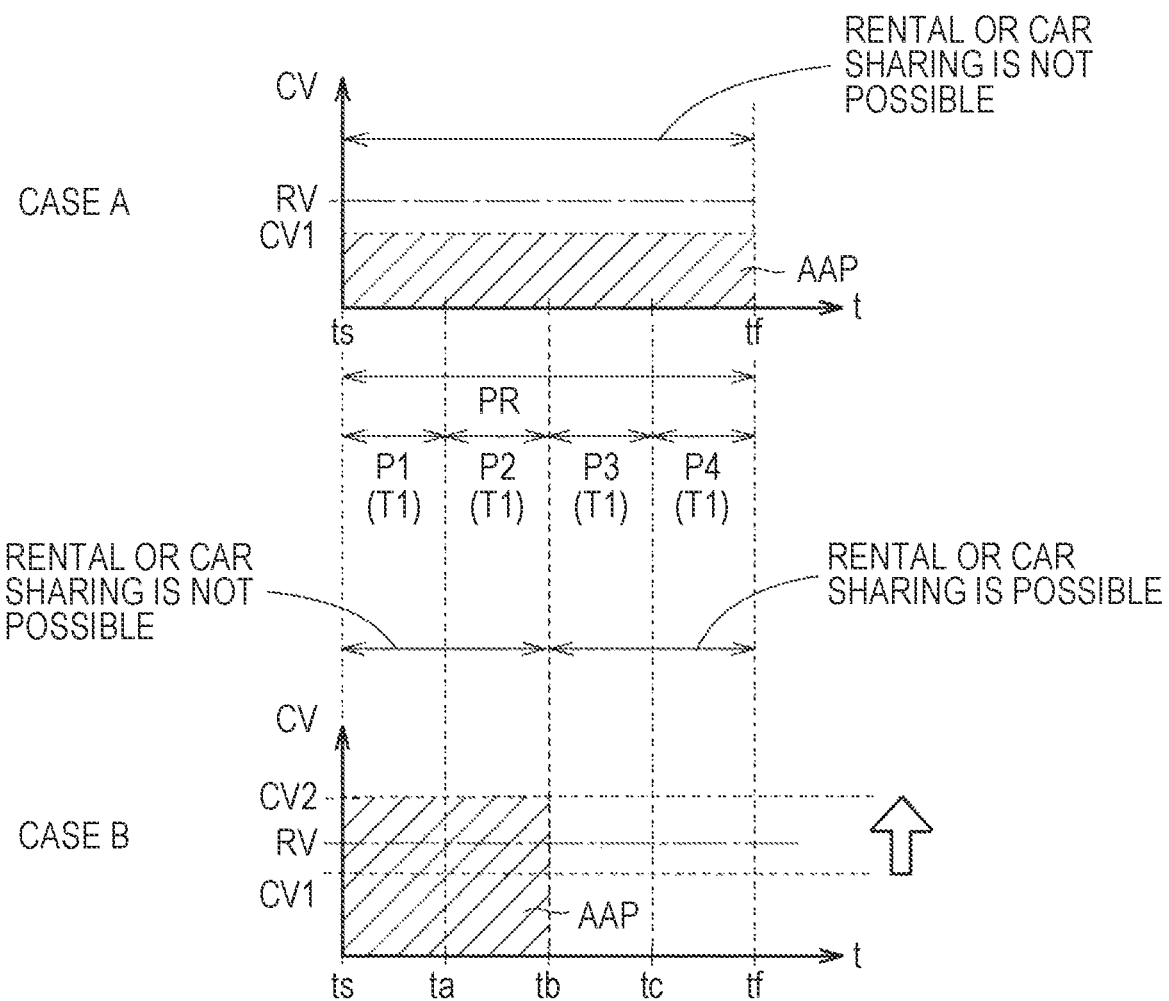
FIG. 11 is a diagram illustrating early ending of participation of a vehicle in DR because a command value is set to be greater.

FIG. 11 is a diagram illustrating a case in which participation of the vehicle 33E in the DR ends earlier because the command value CV is set to be greater.

Referring to FIG. 11, a period PR is a DR period of from time is to time tf and a length thereof is 2 hours in this example. The period PR includes periods P1 to P4 as unit periods of the DR period (also referred to as "unit DR periods"). A time length TI of the unit DR periods is 30 minutes in this example.

In Case A and Case B, the vertical axis represents the command value CV, the horizontal axis represents the time, and electric power AAP represents an allocated electric power of the vehicle 33E (which has a positive value in this example). In Case A, the evaluation value EVV is less than the threshold value. On the other hand, in Case B, the evaluation value EVV is equal to or greater than the threshold value.

In Case A, the server 21 sets the command value CV to CV1 which is lower than a reference value RV. As described above, the reference value RV depends on the specifications of the electric power facility 30. CV1 is a value obtained by dividing the electric power AAP by the length of the period PR. An amount of electric power supplied from the electric power facility 30E to the vehicle 33E in the DR period reaches the electric power AAP at time tf in 2 hours from time ts. In the period from time ts to time tf, use of the vehicle 33E by a client of the provider BE (for example, rental or car sharing) is not possible due to the participation in the DR.

In Case B, the server 21 sets the command value CV to a value higher than the reference value RV (a value which doubles CV1). Accordingly, the amount of supplied electric power doubles in comparison with Case A. As a result, the amount of supplied electric power in the DR period reaches the electric power AAP at time tb in 1 hours from time ts.

In Case B, since the command value CV is set to be great in this way, participation in the DR using a vehicle ends earlier than in Case A. That is, fulfillment of a contract ends earlier.

Accordingly, it is possible to relatively shorten the period in which the vehicle 33E is used as a power-conditioning resource. In other words, it is possible to shorten a period (for example, only periods P3 and P4) which is added as an unavailable period (FIG. 3) due to the participation in the DR. As a result, it is possible to relatively increase a period in which the provider BE can use the vehicle 33E for the purpose of original usage (for example, a period which is presented to a client as a period in which rental or car sharing of the vehicle 33E is possible).

Specifically, in Case B, use of the vehicle 33E by a client is not possible due to participation in the DR in the period from time ts to time tb and use of the vehicle 33E by a client is possible due to early completion of the participation in the DR in the period from time tb to time tf.

Figure 12:
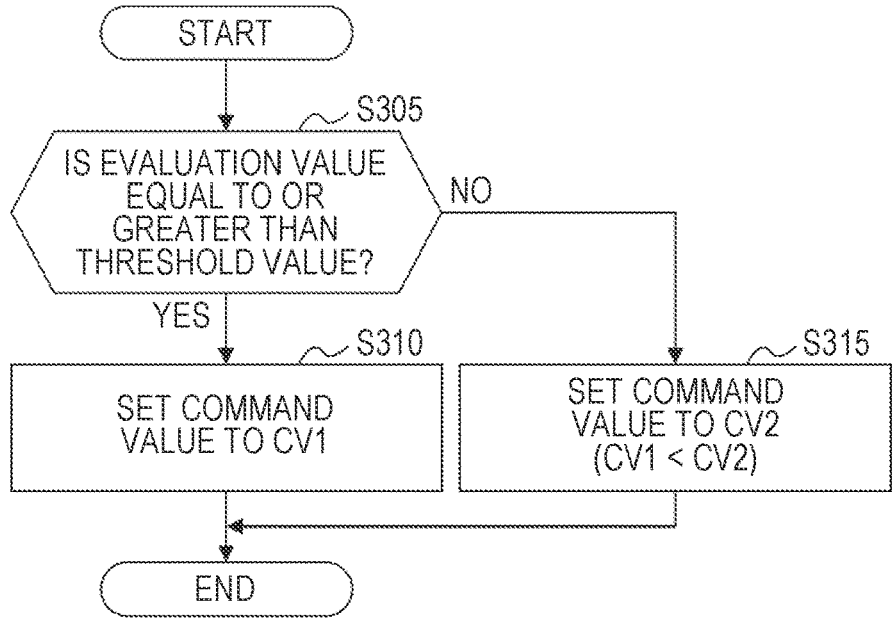
FIG. 12 is a flowchart illustrating an example of a routine which is performed by a processing device of a server according to Modified Example 3.

FIG. 12 is a flowchart illustrating an example of a routine which is performed by the processing device 26 of the server 21 according to Modified Example 3. This flowchart starts (for example, in 5 minutes) before the DR period of the vehicle 33E starts in the second collection period subsequent to the first collection period. This flowchart is performed on the provider BE, and may be performed on another provider in the same way.

Referring to FIG. 12, the server 21 determines whether the evaluation value EVV set for the provider BE in the first collection period is equal to or greater than the threshold value based on the evaluation value data set 720 (FIG. 5) correlated with the first collection period (Step S305).

When the evaluation value EVV is equal to or greater than the threshold value (YES In Step S305), the server 21 sets the command value CV to CV1 (FIG. 11) (Step S310). On the other hand, when the evaluation value EVV is less than the threshold value (NO in Step S305), the server 21 sets the command value CV to CV2 (Step S315).

In Steps S305 to S315, the server 21 sets the command value CV to CV1 or CV2 based on whether the evaluation value EVV is equal to or greater than the threshold value, but the command value CV may change continuously such that the command value CV becomes closer to the upper limit of the amount of supplied electric power as the evaluation value EVV becomes greater.

According to Modified Example 3, when the evaluation value EVV is high, it is possible to benefit the provider BE in comparison with the case in which the evaluation value EVV is low. For example, when the evaluation value EVV is within the upper 20%, it is possible to relatively increase the period in which the vehicle 33E can be originally used for the original usage thereof. Accordingly, it is possible to further motivate the provider BE to contribute to adjustment of electric power demand-supply balance.

MODIFIED EXAMPLE 4

In a power conditioning system 1 according to Modified Example 4, the server 10 (the power company server) may set an electricity rate of the provider BE based on the evaluation value EVV. The electricity rate is a fee that is charged to the provider BE when the provider BE consumes electric power in the power grid 40.

For example, when the evaluation value EVV of the provider BE is high, the server 10 may set the electricity rate of the provider BE to be lower than when the evaluation value EVV is low.

With this configuration, it is possible to benefit the provider BE in view of the electricity rate as the degree of contribution of the provider BE to adjustment of electric power demand-supply balance is high. As a result, it is possible to further motivate the provider BE to contribute to adjustment of electric power demand-supply balance.

Figure 13:
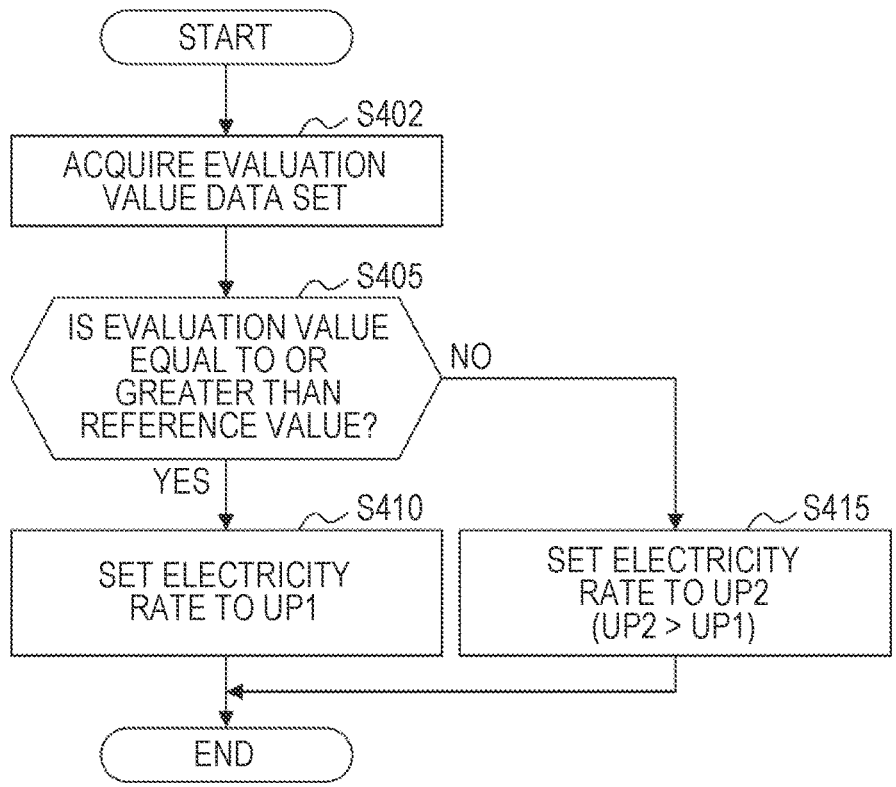
FIG. 13 is a flowchart illustrating an example of a routine which is performed by a server according to Modified Example 4.

FIG. 13 is a flowchart illustrating an example of a routine which is performed by the server 10 according to Modified Example 4. This flowchart starts when the second collection period subsequent to the first collection period comes. This flowchart is performed on the provider BE, and may be performed on another provider in the same way.

Referring to FIG. 13, the server 10 acquires the evaluation value data set 720 (FIG. 5) correlated with the first collection period from the server 21 (Step S402).

The server 10 determines whether the evaluation value EVV set for the provider BE in the first collection period is equal to or greater than the threshold value based on the evaluation value data set 720 (Step S405).

When the evaluation value EVV is equal to or greater than the threshold value (YES in Step S405), the server 10 sets the electricity rate to UP1 (Step S410). On the other hand, when the evaluation value EVV is less than the threshold value (NO in Step S405), the server 21 sets the electricity rate to UP2 (>UP1) (Step S415).

In Steps S305 to S315, the server 21 sets the electricity rate to UP1 or UP2 based on whether the evaluation value EVV is equal to or greater than the threshold value, but may continuously change the electricity rate such that the electricity rate decreases as the evaluation value EVV increases.

According to Modified Example 4, it is possible to benefit the provider BE in view of the electricity rate as the degree of contribution of the provider BE to adjustment of electric power demand-supply balance is high. As a result, it is possible to further motivate the provider BE to contribute to adjustment of electric power demand-supply balance.

Other Modifications

The aggregator may be the same provider as the provider BE. In this case, the server 21 may be unified with the provider server 50.

The aggregator may be the same provider as a power company. In this case, the server 21 may be unified with the server 10.

It should be understood that the aforementioned embodiment of the present disclosure is exemplary in all respects and is not restrictive. The scope of the present disclosure is defined by the appended claims, not by the above description and is intended to include all modifications within meanings and scopes equivalent to the claims.

What is claimed is:

1. A server of an aggregator that requests a power-conditioning resource to participate in demand response for adjusting electric power demand-supply balance in a power grid,
   wherein the power-conditioning resource includes a plurality of provider vehicles that is managed by a vehicle service provider and that is used to provide a service thereof, and
   wherein the server comprises:
      a storage device configured to store collection result information indicating results of participation of the plurality of provider vehicles in the demand response in a predetermined collection period; and
      a processing device configured to set an evaluation value indicating a degree of contribution of the vehicle service provider to the adjustment of electric power demand-supply balance based on the collection result information,
   wherein the power-conditioning resource includes a participation-scheduled vehicle other than the plurality of provider vehicles,
   wherein the participation-scheduled vehicle is a vehicle that is scheduled to participate in the demand response using an electric power facility connected to the power grid,
   wherein the server further comprises a communication device configured to acquire position information indicating a location of the participation-scheduled vehicle, and
   wherein the processing device is configured to:
      predict whether the participation-scheduled vehicle is able to reach the electric power facility at a start time of the demand response based on the position information;
      generate a request signal for requesting a target vehicle which is able to participate in the demand response out of the plurality of provider vehicles to participate in the demand response instead of the participation-scheduled vehicle when it is predicted that the participation-scheduled vehicle is not able to reach the electric power facility at the start time; and
      set the evaluation value to be higher when the target vehicle participates in the demand response in response to the request signal.

2. The server according to claim 1, wherein each of the plurality of provider vehicles is configured to participate in the demand response using the electric power facility connected to the power grid, and
   wherein the evaluation value is determined based on a total amount of electric power transmitted between the plurality of provider vehicles and the electric power facility for participation in the demand response in the collection period.

3. The server according to claim 1, wherein the evaluation value is determined based on a total number of times the plurality of provider vehicles has participated in the demand response in the collection period.

4. The server according to claim 1, wherein the evaluation value is determined based on a total length of periods in which the plurality of provider vehicles has participated in the demand response in the collection period.

5. The server according to claim 1, wherein each of the plurality of provider vehicles is configured to participate in the demand response by receiving electric power supplied from the electric power facility connected to the power grid, and
   wherein the processing device is configured to:
      set a command value for the supplied electric power; and
      set the command value to be greater when the evaluation is high than when the evaluation value is low.

6. The server according to claim 1, wherein the vehicle service provider includes a vehicle rental service provider or a car-sharing service provider.

7. A power conditioning system comprising:
   the server of the aggregator according to claim 1; and
   a power company server configured to request the server of the aggregator to adjust electric power demand-supply balance,
   wherein the power company server is configured to set an electricity rate of the vehicle service provider to be lower when the evaluation value is high than when the evaluation value is low.

8. A server of an aggregator that requests a power-conditioning resource to participate in demand response for adjusting electric power demand-supply balance in a power grid,
   wherein the power-conditioning resource includes a plurality of provider vehicles that is managed by a vehicle service provider and that is used to provide a service thereof, and
   wherein the server comprises:
      a storage device configured to store collection result information indicating results of participation of the plurality of provider vehicles in the demand response in a predetermined collection period; and
      a processing device configured to set an evaluation value indicating a degree of contribution of the vehicle service provider to the adjustment of electric power demand-supply balance based on the collection result information, wherein the power-conditioning resource includes a participation-scheduled vehicle other than the plurality of provider vehicles, wherein the participation-scheduled vehicle is a vehicle that is scheduled to participate in the demand response, wherein the server further comprises a communication device configured to acquire a replacement request from the participation-scheduled vehicle, wherein the replacement request is a signal for requesting the power-conditioning resource instead of the participation-scheduled vehicle to participate in the demand response, and wherein, when the communication device receives the replacement request, the processing device is configured to:

generate a request signal for requesting a target vehicle which is able to participate in the demand response out of the plurality of provider vehicles to participate in the demand response instead of the participation-scheduled vehicle; and set the evaluation value to be higher when the target vehicle participates in the demand response in response to the request signal.

\* \* \* \* \*